Oct. 28, 1969   F. H. TENNIS   3,474,906
VALVE CONTROLLED FILTER CHANGE INDICATOR
Filed March 28, 1967   2 Sheets-Sheet 1

Inventor
Francis H. Tennis

United States Patent Office 3,474,906
Patented Oct. 28, 1969

3,474,906
VALVE CONTROLLED FILTER CHANGE
INDICATOR
Francis H. Tennis, Oconomowoc, Wis., assignor, by mesne assignments, to Koehring Company, Milwaukee, Wis., a corporation of Wisconsin
Filed Mar. 28, 1967, Ser. No. 626,573
Int. Cl. B01d 35/14
U.S. Cl. 210—90                                   8 Claims

ABSTRACT OF THE DISCLOSURE

A valve mechanism sensitive to pressure at the inlet side of a filter effects activation of a signaling device to indicate that the filter should be replaced only after filter pressure has increased to a predetermined value corresponding to a fouled condition of the filter.

---

This invention relates to filters, and has more particular reference to a pressure responsive valve mechanism by which a pressure activatable warning device can be rendered effective to signal when replacement should be made of a filter due to fouling thereof by foreign matter in a fluid medium flowing through the filter.

Filter condition and change indicators ordinarily comprise a plunger which is movable in one direction in response to increase in the differential in pressure across a filter, to any of a number of different positions to afford a continuous visual indication of the extent to which the filter has become fouled by foreign matter in the fluid medium flowing through it.

In contrast, it is the purpose of this invention to provide mechanism which affords an indication that a filter has become fouled only after foreign matter has accumulated therein to such an extent that the filter no longer can function efficiently and should be replaced.

More specifically, it is an object of this invention to provide filter change indicating means which comprises a fluid pressure activatable warning device, and a pressure responsive valve mechanism to govern the warning device and which prevents its operation as long as the filter is capable of performing its function in an acceptable fashion but renders the warning device effective as soon as the inlet pressure of the filter has increased to a predetermined high value due to fouling thereof by foreign matter in the fluid flowing therethrough.

It is also a purpose of this invention to provide filter change indicating means such as described in the preceding object, one form of which causes fluid to bypass the filter at the time the warning device is activated, and another form of which causes fluid to bypass the filter only if it is not replaced within a reasonable time following activation of the warning device.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention, constructed according to the best modes so far devised for the practical application of the principles thereof, and in which.

Figure 1:
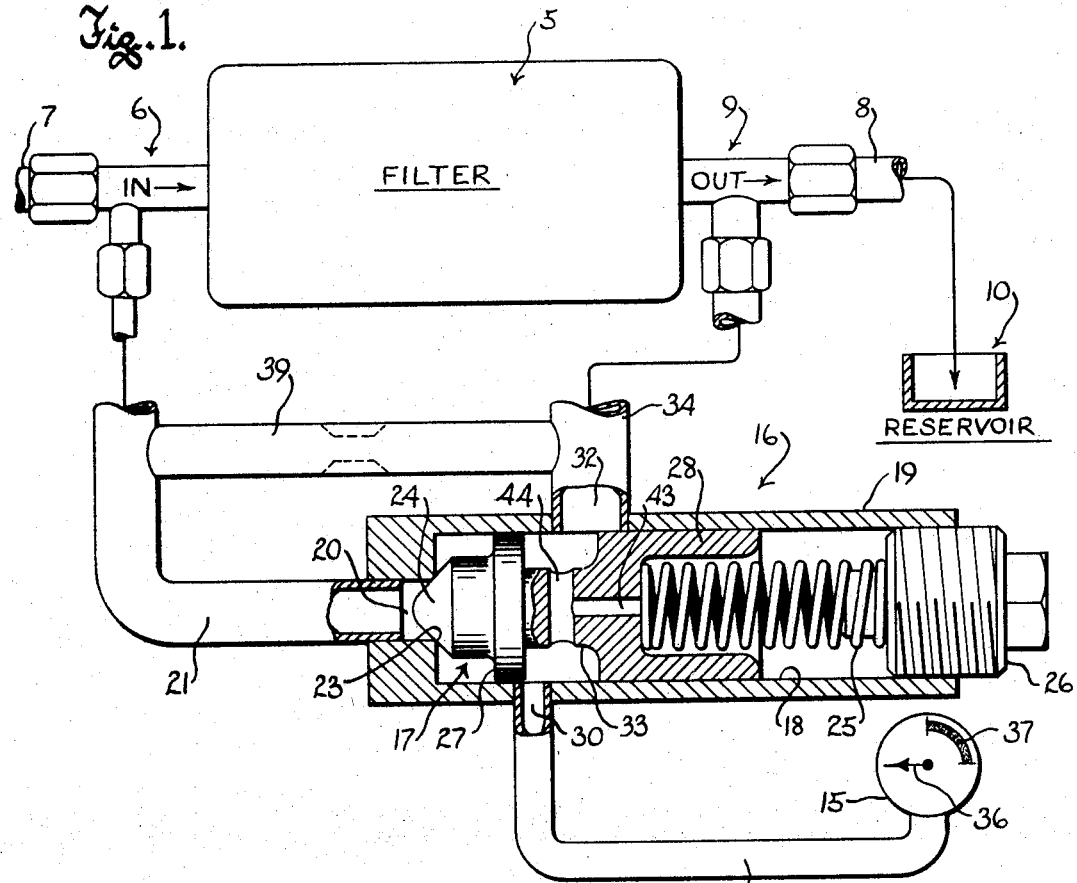
FIGURE 1 is a more or less diagrammatic view, partially in section, illustrating how a valve controlled filter change warning device of this invention can be connected with the inlet of a filter to signal when the filter should be replaced.

Referring now to the accompanying drawings, the numeral 5 generally designates the casing of a filter which, for example, can be of a type such as used in hydraulic systems to remove foreign matter from the hydraulic fluid circulating in the system. The inlet 6 of the filter has been shown as connected with the return line 7 of the system, and an exhaust line 8 connected to the filter outlet 9 conducts filtered fluid to a reservoir 10.

Fluid entering the filter, of course, flows through the customary body of filter material (not shown), housed within the casing in order to reach the outlet 9 of the filter.

Dirt and other foreign solid matter in the fluid entering the filter casing accumulates upon the filter body in its interior, to correspondingly cause the pressure of fluid at the inlet 6 to rise due to the increased resistance to flow through the filter body. Consequently, at a time when the filter can no longer function efficiently due to fouling thereof, the pressure at the inlet 6 is substantially higher than when the filter body is new and clean.

This invention takes advantage of the high pressure obtaining at the inlet side of the filter when the filter body is fouled to effect signaling of such fouled condition and thereby afford a warning that the filter should be replaced. The filter change indicating means of this invention comprises a pressure activatable warning device 15, here shown by way of example as a pressure gauge, and a valve mechanism generally designated 16 for controlling the operativeness of the pressure gauge in accordance with the pressure obtaining at the inlet 6 of the filter.

The valve mechanism 16 comprises a three way valve having a piston-like valve member 17 which is slidable axially back and forth in a cylindrical chamber 18 in the body 19 of the mechanism. An inlet port 20 in the body opens to the forward end of the chamber 18, to provide for connection of the valve mechanism with the inlet side of the filter. A duct 21 can be employed for this purpose, the duct having one end in communication with the inlet port 20 and its other end connecting with the inlet 6 of the filter.

The inlet port 20 has been shown as opening to the valve chamber 18 through an annular valve seat 23, and a nose 24 can be provided on the valve member 17 to engage the seat 23 and close the inlet port 20 and to also define the foremost position of the valve member in the body. A spring 25 confined between the rear of the valve member 17 and a plug 26 adjustably threaded into the rear of the valve body provides forward bias on the valve member by which its nose 24 is normally yieldingly held engaged with the seat 23 to close off the inlet port 20 from the valve chamber 18. The nose 24 projects forwardly from an enlarged head 27 on the valve member, of a size to have free sliding engagement with the wall of the chamber 18. A skirt 28 formed on the valve member in rearwardly spaced relation to the head slidingly engages the wall of the valve chamber to guide the valve member for axial back and forth movement in the chamber.

The valve body is provided with a signal port 30 on its side, opening the chamber 18 at a location such as to be adjacent to the rear of the head 27 on the valve member when the later is in its normal foremost position, and a duct 31 connects the signal port with the gauge 15. The body 19 also has a third port 32 in its side, which provides a vent or exhaust port shown as opening to the chamber 18 at a location slightly rearwardly of the signal port. The vent port is normally communicated with the signal port through the annular space surrounding a reduced neck 33 on the valve member, connecting its head 27 and skirt 28. A duct 34 connects the vent port 32 with the reservoir 10, as for instance through the exhaust line 8 and a portion of the outlet 9 of the filter.

It will thus be seen that the pressure activatable warning device 15 is normally connected with the exhaust line 8, which is always at low or atmospheric pressure, so that the warning device wil remain inoperative as long as the valve member 17 occupies a forward position in chamber 18. When the warning device is a gauge such as shown, its indicator 36 will then register reservoir or zero pressure as seen in FIGURE 1.

Figure 2:
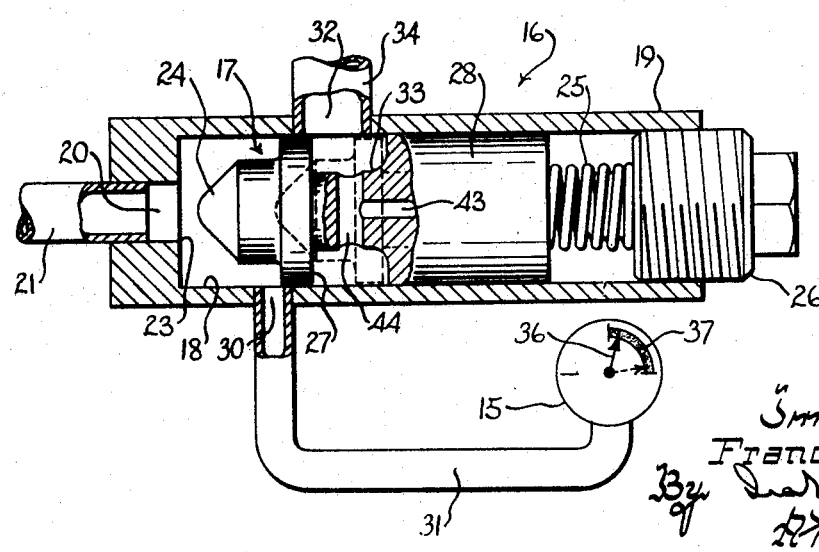
FIGURE 2 illustrates the valve mechanism of FIGURE 1 in an operative condition.

The indicator on the gauge will not move out of its zero position until the pressure of fluid at the inlet side of the filter and acting upon the valve member 17 has increased to a predetermined value at which it causes the valve member to move rearwardly against the biasing force of spring 25 far enough to communicate the signal port 30 with the inlet port 20 and hence with the inlet side of the filter, as shown in FIGURE 2. When this occurs, the warning device is activated, and the indicator 36 on the gauge will suddenly jump clockwise from its zero position to the warning band 37 on the gauge, as indicated by the solid line illustration of the indicator seen in FIGURE 2, to signal that the filter should be replaced. In the solid line signal activating position of the valve element seen in FIGURE 2, it will be noted that the head 27 of the valve element closes off the vent port from both the inlet port 20 and the signal port 30, so as to prevent fluid flow to the exhaust line 8 in bypass relation to the filter.

It should be appreciated that the pressure which filter inlet fluid exerts upon the valve member 17 will increase slowly as dirt begins to accumulate in the filter body. The filter, however, can operate in a satisfactory way for a considerable period of time during which more dirt accumulates in the filter body and the pressure at the inlet side of the filter increases accordingly. When this increasing pressure causes a force to be exerted on the nose 24 of the valve element greater than the biasing force of the spring 25, the valve element 17 will move rearwardly from its forward position seen in FIGURE 1 to open the inlet port 20. The compression of the spring 25 that takes place during such rearward response of the valve element tends to impose a greater forward biasing force on the element, but this tendency is largely offset by the fact that pressure fluid then entering the inlet portion of the valve chamber can act upon the larger diameter head 27 of the valve element as well as upon its nose 24.

The valve element will continue to move rearwardly in response to further increase in pressure at the inlet side of the filter until the head 27 on the valve member passes the forward edge of the signal port 30, whereupon the warning device 15 suddenly responds as described. However, it should be observed that the force with which the spring 25 resists rearward movement of the valve element to its signal activating position is selected to assure that activation of the warning device does not take place until the pressure at the inlet side of the filter has increased to a predetermined value that obtains when the filter is no longer able to function in a satisfactory fashion and should be replaced. It is for this reason that the biasing force of the spring 25 is adjustable, by turning the plug 26 in one direction or the other.

If the signal provided by the warning device 15 is ignored and the filter is not replaced within a reasonable time following the warning, the valve mechanism 16 of this invention will function to conduct fluid from the inlet side of the filter to the exhaust line 8 in bypass relation to the filter. It does so in response to the further increase in pressure at the inlet side of the filter that results from the filter body aproaching a clogged condition. Thus, when pressure at the inlet side of the filter increases toward a second predetermined value, in excess of that which causes activation of the warning device 15, the valve element 17 responds to the increasing pressure by moving rearwardly toward a bypass position at which the inlet port 20 is in communication with the vent port 32 as well as with the gauge port 30, and fluid from the inlet side of the filter will flow through the valve mechanism to the reservoir in bypass relation to the filter. The broken lines in FIGURE 2 indicate an extreme bypass position of the valve element at which all of the fluid entering the inlet port 20 is capable of flowing to the reservoir through the bypass port 32, while at the same time maintaining the warning device in an activated condition.

At times when all three valve ports 20, 30 and 32 are in communication with one another, the indicator on the gauge will remain in its position on the warning band of the gauge, and may even swing to a position such as shown in broken lines at FIGURE 2, at the far end of the band if the warning is ignored and the filter is not replaced.

If desired, a restricted bypass duct 39 can be connected between the ducts 21 and 34 in the manner seen in FIGURE 1 to at all times enable a predetermined desired percentage of the fluid flowing in the return line 7 of the system to be conducted to the reservoir in bypass relation to the filter. This, however, is purely an optional feature of the invention.

It is also an optional feature of the invention to provide the valve element 17 with a nose 24 for closing the inlet port 20 in the foremost position of the valve element. One of the main functions of the nose 24 is to provide a stop for defining the foremost position of the valve element, toward which it is biased by the spring 25. For that reason, the valve seat 23 engaged by the nose does not require any elaborate machining. Any fluid that leaks past the nose from inlet port 20, in the foremost position of the valve element, can escape to the vent port 32 through the normal clearance around the valve head 27 so that there will be no tendency for a valve actuating pressure to build up in the inlet portion of the valve chamber.

As an alternative, the nose 24 can be provided with an axial passage 40 opening to its front and intersecting a radial passage 41 in the nose so located as to communicate the inlet port 20 with the front portion of the valve chamber even when the valve element is in its foremost position within the valve body. This modification of the invention is seen in FIGURE 4, where it will be noted that the entire front portion of the valve element, including the forwardly facing surface of its head 27, is at all times exposed to the pressure of fluid at the inlet port 20.

Figure 3:
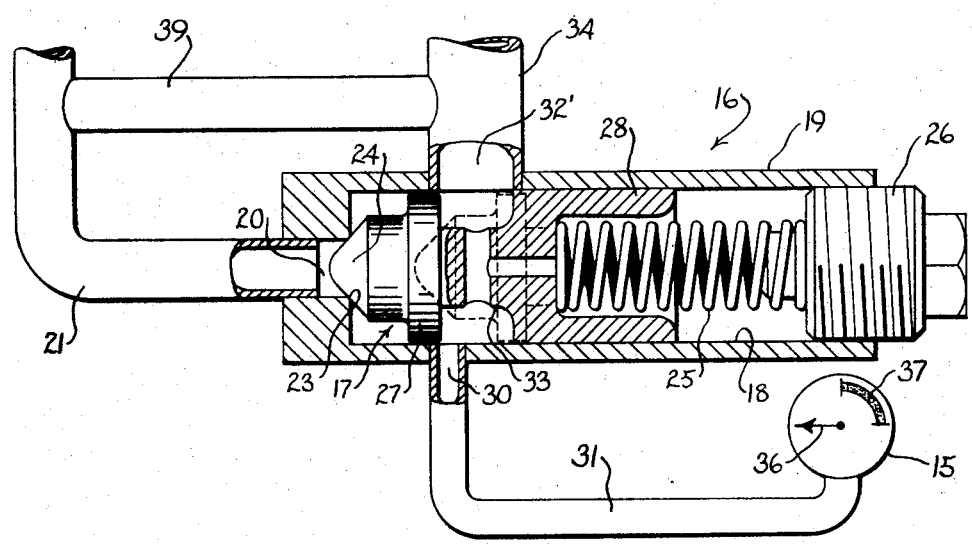
FIGURE 3 is a view similar to FIGURE 1, but illustrating a modified embodiment of the invention.

In another modified embodiment of the invention shown in FIGURE 3, the vent port 32' is located slightly farther forwardly and in such relation to the gauge port 30 that the vent port 32' will be communicated with the inlet port 20 at substantially the same time as the latter port is communicated with the inlet port. Accordingly, fluid will begin to bypass the filter through the vent port at about the same time as the warning device 15 is activated by response of the valve element to pressure at the inlet side of the filter of a value such as obtains when the filter should be replaced.

Figure 4:
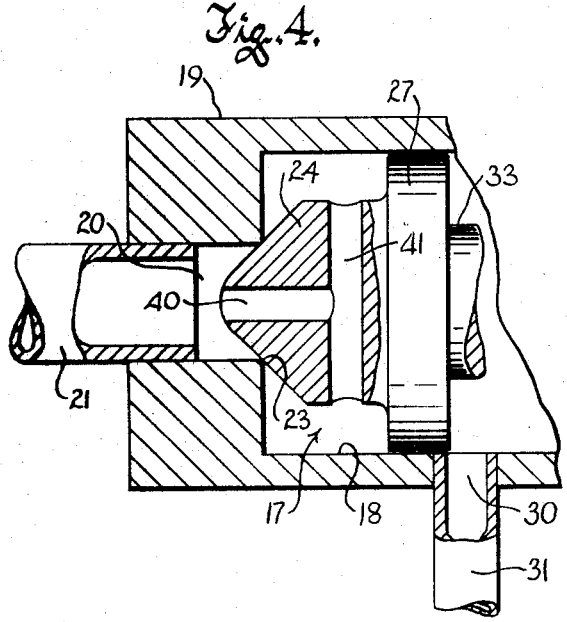
FIGURE 4 is a fragmentary view illustrating still another form of the invention.

In all other respects, the valve mechanism shown in FIGURE 3 is the same as that of the FIGURE 1 embodiment, although if desired, the nose 24 thereof may also be provided with the axial and radial passages 40 and 41 of the valve mechanism seen in FIGURE 4.

In each embodiment of the invention, however, the space in the rear portion of the valve chamber 18, behind the valve element, is communicated with the vent port through a passageway comprising an axial passage 43 in the skirt and a radial passage 44 in the neck 33 of the valve element. Hence, fluid in the rear of the chamber can flow to the vent port when the valve element is displaced rearwardly from its normal position in the chamber.

It will be appreciated that the valve mechanism 16 can have its inlet and vent ports 20 and 32 respectively connected with the inlet and outlet sides of the filter in any desired way, the connections here shown being mainly for purposes of illustration. It will also be appreciated that the signal device 15 need not be a pressure gauge, but can be provided by any suitable pressure activatable warning device. For example, a pressure actuated electric switch governing either an audible or visible alarm, or both types of alarms, would serve the purpose equally as well.

From the foregoing description, together with the accompanying drawings, it will be readily apparent to those skilled in the art that this invention provides an improved filter change indicator featuring a valve mechanism which is adapted to sense the pressure obtaining at the inlet side of the filter and which functions to effect activation of a signaling device only after the filter inlet pressure has risen to a predetermined valve corresponding to a fouled condition of the filter.

What is claimed as my invention is:

1. Valve mechanism by which a pressure activated warning device can be rendered effective to signal when replacement should be made of a filter due to fouling thereof by foreign matter in a fluid medium flowing therethrough, said valve mechanism being characterized by:
   (A) structure defining an elongated valve chamber;
   (B) a pressure sensitive valve member in the chamber slidable in one direction therein toward an operating position from a defined normal position;
   (C) means for supplying fluid from the inlet side of a filter to an inlet port at one end of the chamber so that fluid pressure in said end of the chamber will increase as foreign matter accumulates in the filter and will act upon the valve member to move it toward its operating position;
   (D) a signal port which opens to the chamber at a location spaced longitudinally from said inlet port, said valve member having a portion which normally occupies a position intermediate said ports to block communication therebetween, said valve portion in said operating position being at the side of said signal port remote from said inlet port to afford communication between said ports so as to render effective a pressure activatable warning device connected with the signal port;
   (E) a vent port which opens to the chamber at a location such that the valve member normally closes it off from said pressured end of the chamber but communicates it with the signal port;
   (F) and biasing means acting upon the valve member to yieldingly resist movement thereof to its operating position with a force which is not overcome until the pressure in said one end of the chamber increases to a predetermined value reached when the accumulation of foreign matter in the filter warrants replacement thereof.

2. The valve mechanism of claim 1, wherein said signal and vent ports are located to be concurrently communicated with said pressured end of the chamber whenever the valve member is moved beyond said operating position thereof in response to pressure in said end of the chamber in excess of said predetermined value.

3. The valve mechanism of claim 1, further characterized by:
   (A) said chamber being cylindrical in cross section;
   (B) the valve member comprising a piston having a head thereon;
   (C) and the signal and vent ports opening through the side of the chamber at locations such that the head normally blocks communication of said ports with the pressured end of the chamber but substantially simultaneously communicates them therewith in said operating position of the valve member.

4. The valve mechanism of claim 3, further characterized by means normally communicating the vent port with the opposite end of the chamber.

5. Valve mechanism by which a pressure activated warning device can be rendered effective to signal when replacement should be made of a filter due to fouling thereof by foreign matter in a fluid medium flowing therethrough, said valve mechanism being characterized by:
   (A) structure defining an elongated cylindrical valve chamber having front and rear ends;
   (B) a pressure sensitive valve member in the chamber having a head and a nose projecting forwardly therefrom and normally engaged with an annular valve seat, said valve member being slidable rearwardly toward an operating position spaced from the seat;
   (C) the chamber having an inlet port in its front end which is connectable with the inlet side of a filter so that pressure of fluid at the inlet port will increase as foreign matter accumulates in the filter, said inlet port opening coaxially into the chamber through said valve seat so that said increased pressure will act upon the valve member to move it toward its operating position;
   (D) a signal port which opens to the side of the chamber behind the valve head and normally blocked off thereby from the inlet port but communicable therewith when the valve member is in its operating position to then render effective a pressure activatable warning device connected with the signal port;
   (E) a vent port which opens to the chamber at a location behind the valve head and such that it is normally closed off thereby from the inlet port but in communication with the signal port;
   (F) and biasing means acting upon the valve member to yieldingly resist movement thereof to its operating position with a force which is not overcome until the pressure at the inlet port increases to a predetermined value reached when the accumulation of foreign matter in the filter warrants replacement thereof.

6. The valve mechanism of claim 5, wherein axial and radial passages in said nose communicate the inlet port with the front portion of the chamber forwardly of the head on the valve member in the normal position thereof.

7. Mechanism for signalling when a filter should be replaced when fouled by foreign matter in a fluid flowing therethrough, comprising the combination of:
   (A) a pressure activatable warning device;
   (B) and valve means controlling the warning device, said valve means having
      (1) a body with a bore therein,
      (2) an inlet port to connect with the inlet side of a filter and opening to said bore,
      (3) a signal port connected with the warning device and also opening to said bore at a zone spaced longitudinally from the inlet port,
      (4) and a fluid pressure actuatable valve member movably mounted in said bore, said valve member having a portion which normally occupies a position intermediate said signal and inlet ports so as to block communication therebetween and thus maintain the warning device inoperative, and said valve member being movable in consequence of increase in pressure at the inlet side of the filter to a predetermined value to an operative position at which said portion thereof is at the side of the signal port remote from the inlet port to afford communication between said ports and thereby cause said increased pressure to be imposed upon the warning device for activation thereof.

8. The combination of claim 7, further characterized by an exhaust port in the body, opening to said bore at a zone spaced to the same side of the inlet port as the signal port and normally communicating with the latter through the bore, but closed off from the signal port by said portion of the valve member in said operative position thereof, said exhaust port being located to be communicated with the inlet port by the valve member in another position of said portion thereof to which it is moved in consequence of increase in pressure at the inlet port to a second predetermined value in excess of said first predetermined value.

References Cited

UNITED STATES PATENTS

| 2,678,134 | 5/1954 | Middleton | 210—90 |
| 2,776,056 | 1/1957 | Douglas | 210—90 |
| 3,080,972 | 3/1963 | Smith | 210—90 |
| 3,150,633 | 9/1964 | Holl | 210—90 X |
| 3,229,816 | 1/1966 | Rosaen | 210—130 |

FOREIGN PATENTS 450,104   7/1936   Great Britain.

SAMIH N. ZAHARNA, Primary Examiner

U.S. Cl. X.R.

116—70; 137—557; 210—130